US 6,556,827 B1

(12) United States Patent
Oh

(10) Patent No.: US 6,556,827 B1
(45) Date of Patent: Apr. 29, 2003

(54) METHOD OF MANAGING A PLURALITY OF RADIO LINKS IN WIRELESS LOCAL LOOP

(75) Inventor: Sun-Mi Oh, Seoul (KR)

(73) Assignee: Samsung Electronics Co., LTD, Suwon (KR)

( * ) Notice: Subject to any disclaimer, the term of this patent is extended or adjusted under 35 U.S.C. 154(b) by 0 days.

(21) Appl. No.: 09/524,246

(22) Filed: Mar. 13, 2000

(30) Foreign Application Priority Data

Mar. 12, 1999 (KR) .......................................... 1999-8196

(51) Int. Cl.⁷ ................................................. H04Q 7/20
(52) U.S. Cl. ..................... 455/426; 455/3.05; 455/560; 455/561
(58) Field of Search ................................ 455/426, 3.05, 455/422, 500, 517, 554, 555, 560, 561, 509; 370/320, 328, 335, 347, 350, 342, 441; 379/219, 229, 348

(56) References Cited

U.S. PATENT DOCUMENTS 5,533,027 A  *  7/1996  Akerberg et al.  ........... 370/347
5,819,177 A  * 10/1998  Vucetic et al.  ............... 455/423

FOREIGN PATENT DOCUMENTS

| WO | WO 98/08352 A1 | * | 2/1998 | ............. H04Q/7/36 |
| WO | WO 98/31179 A1 | * | 7/1998 | ............. H04Q/7/38 |
| WO | WO 99/12376 A2 | * | 3/1999 | ............. H04Q/7/38 |

* cited by examiner

Primary Examiner—Quochien Vuong
(74) Attorney, Agent, or Firm—Steve Cha; Cha & Reiter

(57) ABSTRACT

A method of managing a plurality of radio links in a WLL (Wireless Local Loop) is provided. The state of each radio link are defined as L2_NewLid indicating establishment of the radio link is requested but not completed, LNK indicating that a new connection is established to the radio link, and L3_AddReq indicating establishment of the radio link is pending. A data link layer of a base station manages each radio link between a terminal and the base station referring to the state of the radio link. Upon request for establishing a radio link, the data link layer sets the LNK of the radio link to 1. Upon request for releasing the radio link, the data link layer sets the LNK of the radio link to 0. Upon request for adding a radio link, the data link layer adds the radio link by checking the L2_NewLid and the LNK of the radio link. Upon request for adding a radio link in an exception recovery state, the data link layer sets the L3_AddReq of the data link to 1, waits to transit to a multi-frame established state, and adds the radio link in the multi-frame established state.

15 Claims, 9 Drawing Sheets

|   | L2_NewLid | LNK | L3_AddReq |
|---|---|---|---|
| 1 | 1 | 1 | 1 |
| 2 | 1 | 1 | 0 |
| 3 | 1 | 0 | 1 |
| 4 | 1 | 0 | 0 |
| 5 | 0 | 1 | 1 |
| 6 | 0 | 1 | 0 |
| 7 | 0 | 0 | 1 |
| 8 | 0 | 0 | 0 |

FIG. 3

| BIT OCTET | 8 | 7 | 6 | 5 | 4 | 3 | 2 | 1 |
|---|---|---|---|---|---|---|---|---|
| 1 | LENGTH ||||||||
| 2 | LID ||| SAPI ||  C/R | EST I FLAG | EXT I FLAG |
| 3 | LID ||| P/F | N(S) ||||
| 4 | N(R) ||| P/F | 0 | 0 | 0 | 1 |
| 5 | INFORMATION ||||||||
| 6 | CRC ||||||||

FIG. 6

METHOD OF MANAGING A PLURALITY OF RADIO LINKS IN WIRELESS LOCAL LOOP

CLAIM OF PRIORITY

This application claims priority to an application entitled "Method of Managing a Plurality of Radio Links in Wireless Local Loop" filed in the Korean Industrial Property Office on Mar. 12, 1999 and assigned Serial No. 99-8196.

BACKGROUND OF THE INVENTION

1. Field of the Invention

The present invention generally relates to a wireless local loop (WLL), and in particular, to a method of managing a plurality of radio links in the WLL to set up, add, and release the plurality of radio links between a terminal and a base station (BS).

2. Description of the Related Art

A WLL system wirelessly links a wired subscriber terminal to a telephone office. The WLL system is basically the same as a mobile communication system, except for the fixedness of subscriber terminals.

FIG. 1 illustrates a general WLL configuration based on W-CDMA (Wide-band Code Division Multiple Access), which can be applied to any radio system using the WLL as a substitute for a subscriber line between a fixed network and a subscriber. As shown in FIG. 1, the WLL system includes a terminal 20 connected to a subscriber equipment 10 such as a facsimile or a wired telephone, a base station 30 connected to the terminal 20 via a radio link, a base station controller (BSC) 40 connected to the base station 30 by a trunk line, a local exchange (LE) 50 connected to the BSC 40 by a trunk line, and a public switched telephone network (PSTN) 60 for connecting the LE 50 to another network.

A data link layer, being a layer 2 (L2), manages the radio link between the base station 30 and the terminal 20. The data link layer establishes and releases a radio channel in a radio interface between the base station 30 and the terminal 20, and manages the data transmission between them by W-CDMA technology.

In the thus-constituted WLL, if the base station 30 or terminal 20 requests a call set-up, the BSC 40 commands the base station 30 to assign radio resources (radio channel). Then, the data link layer of the base station 30 controls the terminal 20 and assigns the radio resources to the radio interface.

The terminal 20 is connected to at least one subscriber equipment 10 (facsimile, wired telephone, or personal computer). If the terminal 20 is connected to a plurality of subscriber's equipment 10, a plurality of calls should be set up between the base station 30 and the terminal 20.

When the radio interface is in a single mode, the data link layers of the base station 30 and the terminal 20 assign an extra signaling radio channel for each call every time the call is attempted.

However, when the radio interface is in a multiple mode, a data link layer checks whether a signaling channel already has been assigned to a terminal which attempts a call, and sets up only a new radio link for sharing the assigned channel in the presence of the assigned channel. That is, the multiple-mode data link layer divides one channel into a plurality of radio links using the link Ids, and uses one radio link for each call.

FIG. 2 depicts a message flow for the radio links between the general data link layers in a conventional radio link managing method. If the BSC 40 sends an establish request message APL2_EST_REQ to the base station 30. The base station 30 determines the ID (LID) of a radio link to be established and sends a receive ready message (RR message) including the LID to the terminal 20, in step M120.

After setting up a radio link corresponding to the LID included in the RR message, at step M130, the terminal 20 sends an RR message (ACK RR message) including the LID, indicating acknowledgment to the base station 30. At step M140, upon the receipt of the ACK RR message, the base station 30 sends the BSC 40 an establish confirm message APL2_EST_CNF, notifying the set-up of the radio link with the LID. When the radio link is completely established, the base station 30 and the terminal 20 communicate over the radio link.

If a call is connected between another subscriber linked to the terminal 20 and the base station 30 during the communication, the BSC 40 requests the set-up of an additional radio link to the base station 30. This procedure is called "add." In this case, at step M150, the BSC 40 sends an add request message APL2_ADD_REQ to the base station 30. At step M160, the base station 30 sends the terminal 20 an RR message including a new LID.

At step M170, the terminal 20 sets up the additional radio link with the new LID and sends an ACK RR message to the base station 30. At step M180, upon receipt of the ACK RR message, the base station 30 sends the BSC 40 an add confirm message APL2_ADD_CONF, notifying that the radio link that the new LID is added.

If calls are released from some or all of the radio links established between the terminal 20 and the base station 30, the BSC 40 sends the base station 30 and the terminal 20 a release request message in step M190. Then, the base station 30 and the terminal 20 release some or all of the established radio links.

However, a problem with the conventional radio link managing method is that if a BSC requests the set-up of a radio link to a base station, the base station cannot find out whether the requested radio link is to be a newly established radio link or an additional radio link (an add). Then, the radio link already established for a certain subscriber equipment is set up for another subscriber equipment, or the established radio link is released, thereby disconnecting a call. Consequently, the radio link management is implemented by influencing an existing call on another established radio link in the conventional method.

SUMMARY OF THE INVENTION

It is, therefore, an object of the present invention to provide a multiple radio link managing method in a WLL, wherein the data link layers of a terminal and a base station are able to set up a new radio link, add an extra radio link, and release an established radio link without influencing an existing call.

To achieve the above object, there is provided a method of managing a plurality of radio links in a WLL. In the present invention, the state of each radio link is defined as: (1) L2_NewLid, indicates that establishment of a radio link is requested but not completed; (2) LNK which indicates that a new connection is established to the radio link; and, (3) L3_AddReq, which indicates that the establishment of the radio link is pending. In a method of managing a plurality of radio links between a base station and a terminal according to an aspect of the present invention, the base station receives a radio link establish request message. Then, a data link layer of the base station sets the LNK of a radio link to be established to a logic 1, transmits a request for establishing the radio link to the terminal, receives an acknowledgment from the terminal, notifies a BSC that the radio link is established upon the receipt of the acknowledgrnent, and initiates a service between the terminal and the base station on the established radio link.

In a method of managing a plurality of radio links between a base station and a terminal according to another aspect of the present invention, a data link layer of the base station receives an add request message for a new radio link on a radio link, and checks L2_NewLid and LNK of the new radio link to be added if the data link layer is in a multi-frame established state. If L2_NewLid and LNK are logic 1s, the data link layer adds the new radio link. If L2_NewLid is logic 1 and LNK is logic 0, the data link layer determines that frame errors have occurred and performs an add failure operation. If L2_NewLid is logic 0 and LNK is logic 1, the data link layer performs an add failure operation. If both L2_NewLid and LNK are logic 0s, the data link layer sets both L2_NewLid and LNK of the new radio link to logic 1s and adds the new radio link.

According to a further aspect of the present invention, a method of managing a plurality of radio links between a base station and a terminal a data link layer of the base station receives an add request message for a new radio link on a radio link and checks L2_NewLid and LNK of the new radio link to be added if the data link layer is in an exception recovery state. If L2_NewLid and LNK are logic 1s, the data link layer sets L3_AddReq of the new radio link to 1. If L2_NewLid is 1 and LNK is 0, the data link layer determines that frame errors have occurred and performs an add failure operation. If L2_NewLid is 0 and LNK is 1, the data link layer also performs an add failure operation. If both L2_NewLid and LNK are 0s, the data link layer sets L2_NewLid, LNK, and L3_AddReq of the new radio link to 1s, waits to transit to a multi-frame established state, searches for a radio link with L3_AddReq=1 after the data link layer transits to the multi-frame established state, sets L3_AddReq of the searched radio link to 0, and adds the searched radio link.

According to another aspect of the present invention, a method of managing a plurality of radio links between a base station and a terminal the base station receives a release request message for a radio link. Then, a data link layer of the base station sets LNK of the radio link to be released to 0, transmits a release request message for the radio link to the terminal, receives an acknowledgment from the terminal, and notifies a BSC that the radio link is released upon the receipt of acknowledgment.

BRIEF DESCRIPTION OF THE DRAWINGS

The above and other objects, features and advantages of the present invention will become more apparent from the following detailed description when taken in conjunction with the accompanying drawings in which:

FIG. 3 illustrates the status of radio links according to the present invention;

FIG. 6 illustrates a message format in the data link layer according to the present invention;

DETAILED DESCRIPTION OF THE PREFERRED EMBODIMENTS

Preferred embodiments of the present invention will be described hereinbelow with reference to the accompanying drawings. For the purpose of clarity, well-known functions or constructions are not described in detail since they would obscure the invention in unnecessary detail.

In the present invention, an unique LID is assigned to each of the plurality of radio links which can be established between one terminal and one base station, and three variables indicating the status (establishment, addition, and pending) of each radio link are defined as L2_newLid, LNK, and L3_AddReq, respectively.

The L2_NewLid indicates that the establishment of a corresponding radio link is requested but not completed, the LNK indicates that a new connection is established to the radio link, and the L3_AddReq indicates that the establishment of the radio link is pending.

That is, if the L2_NewLid is 1, the establishment of a corresponding radio link is requested but not completed. If the LNK is 1, a new connection is established to the radio link. If the L3_AddReq is 1, the establishment of the radio link is pending.

The three variables are unsigned characters. An RU checks the status of a radio link and manages it using the L2_NewLid and the L3_AddReq.

FIG. 3 illustrates the status of a radio link defined in the present invention.

(1) [L2_NewLid, LINK, L3_AddReq]=[1, 1, 1]: a corresponding radio link receives an add request message APL2_ADD_REQ from a higher layer (BSC) and is placed in a pending state;

(2) [L2_NewLid, LINK, L3_AddReq]=[1, 1, 0]: the radio link receives an add request from the BSC, sends an RR message requesting "add", and then awaits an ACK RR message;

(3) [L2_NewLid, LINK, L3_AddReq]=[0, 1, 0]: the radio link is completely added and the communication is conducted on the radio link;

(4) [L2_NewLid, LINK, L3_AddReq]=[0, 0, 0]: either an add request or an establish request is not issued and the radio link is not in use.

To set up a call between a base station and a terminal in a WWL, the base station has the right to assign resources (radio channel and radio link) and a data link layer of the terminal operates under the control of the base station. Accordingly, a data link layer of the base station leads the radio link management.

When a radio link is to be established, added, or released, the data link layer of the base station checks L2_NewLid and L3_AddReq of the radio link and then performs a necessary operation. Here, the data link layer is set in a plurality of status according to necessary operations.

Figure 1:
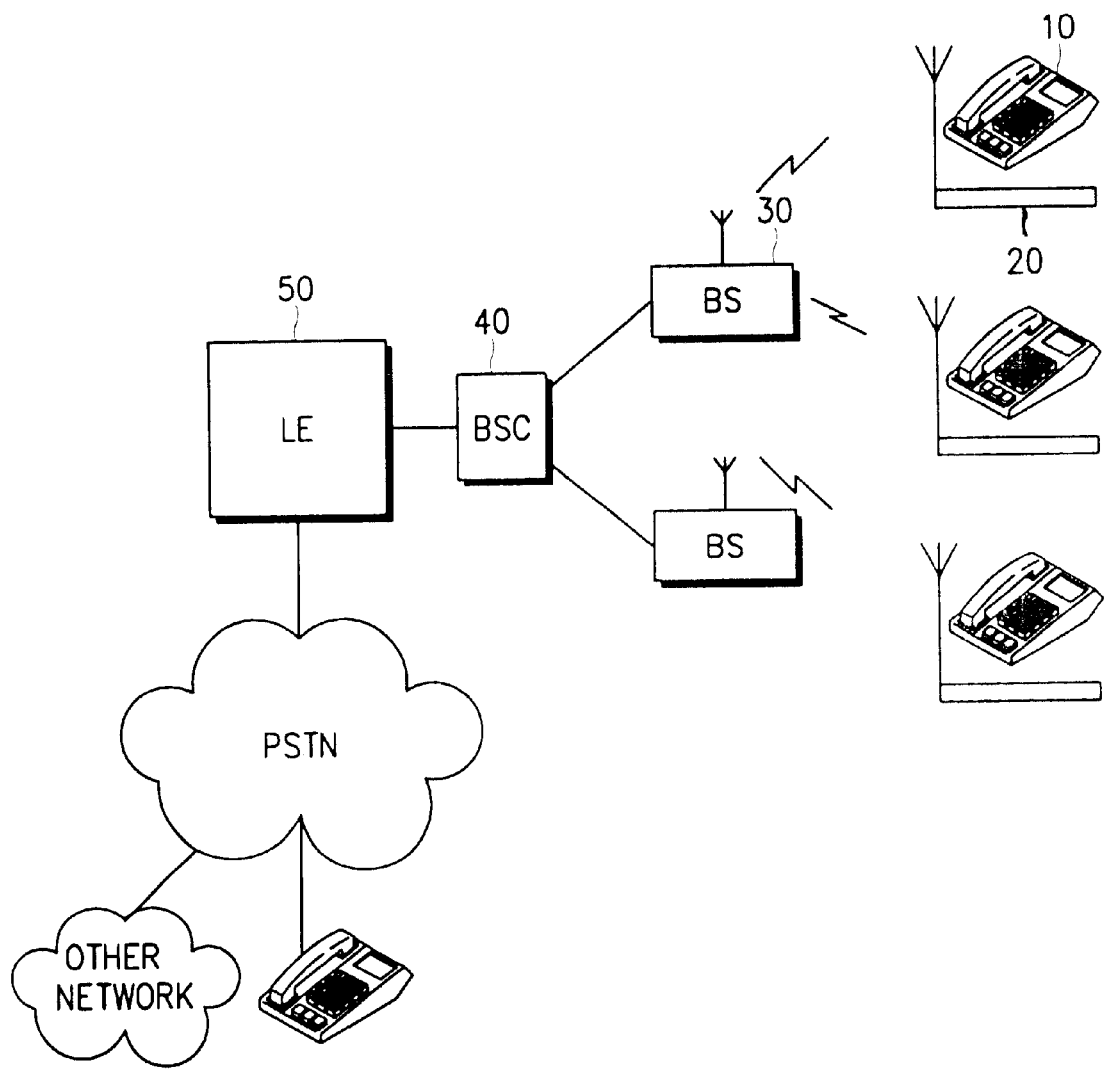
FIG. 1 illustrates a general WLL configuration.
Figure 2:
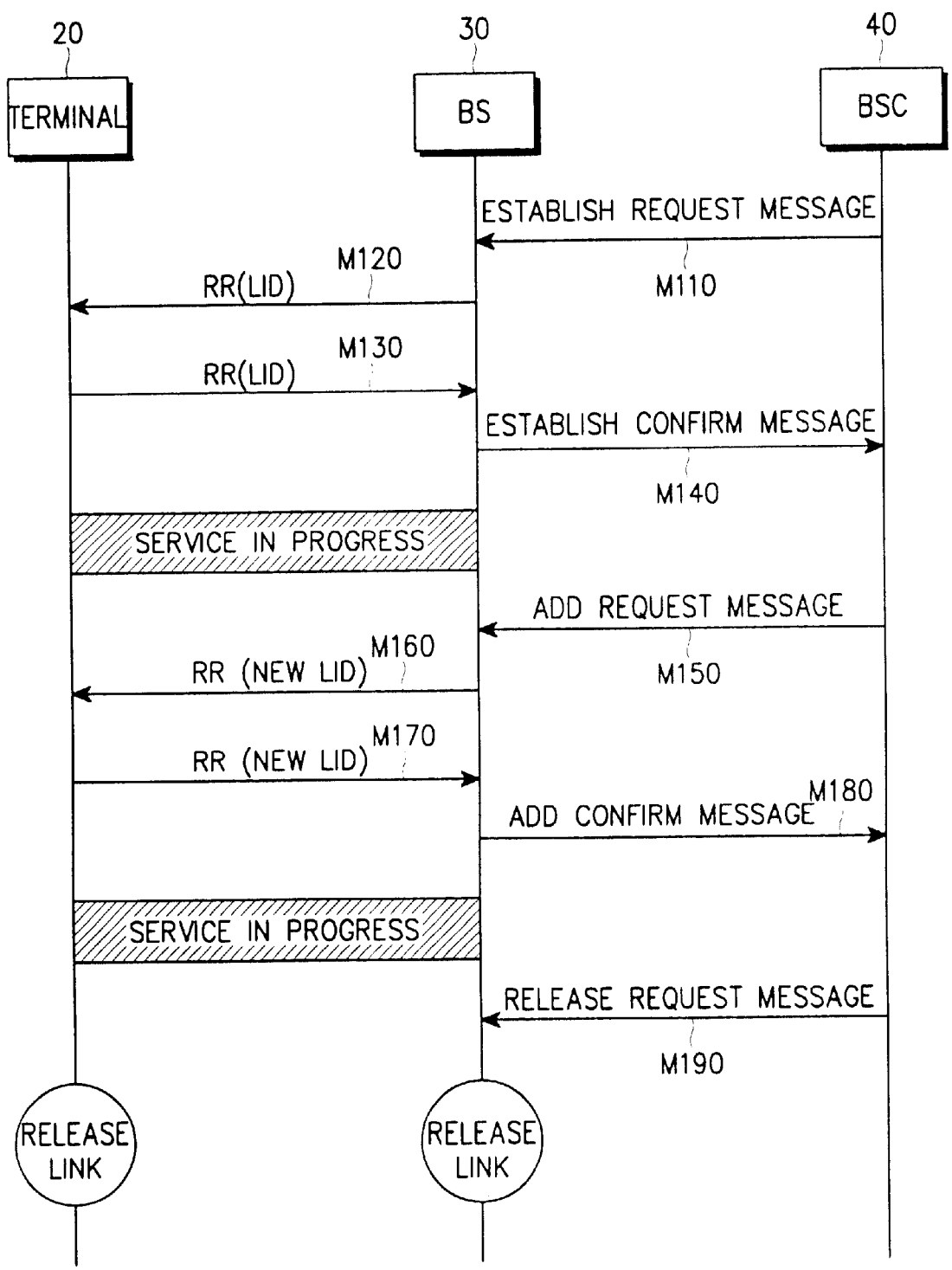
FIG. 2 illustrates a general message flow for managing the radio links between data link layers.
Figure 4:
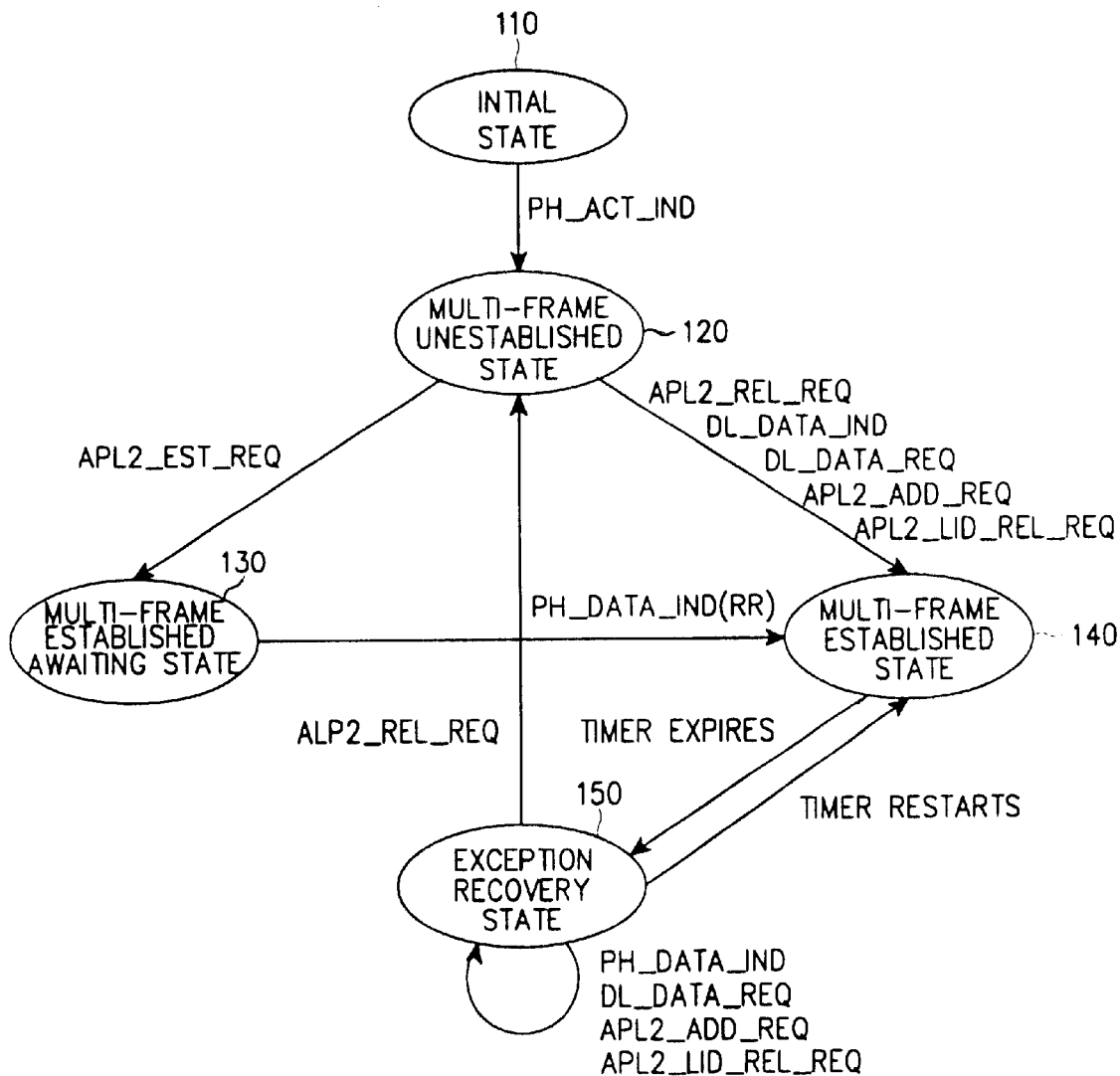
FIG. 4 is a state transition diagram of a data link layer applied to the present invention.

FIG. 4 is a status transition diagram of a data link layer applied to the present invention. Referring to FIG. 4, upon the receipt of an activation indicator ACT_IND in an initial state 110, the data link layer enters a multi-frame unestablished state 120. No radio links are established between a terminal and a base station and a new radio link can be established in the multi-frame unestablished state 120.

Upon the receipt of an establish request message APL2_EST_REQ from a BSC in the multi-frame unestablished state 120, the data link layer transits to a multi-frame established awaiting state 130. In the multi-frame established awaiting state 130, the base station sends an RR message to the terminal, requesting the establishment of a radio link, then awaits an ACK RR message from the terminal.

Upon the receipt of the ACK RR message from the terminal, the data link layer transits from the multi-frame established awaiting state 130 to a multi-frame established state 140. In the multi-frame established state 140, a radio link is established and the terminal communicates with the base station. The data link layer transmits/received data on the currently connected radio link, releases the radio link, or adds a new radio link in this state.

Upon the receipt of a data transmission-related message PH_DATA_IND, DL_DATA_REQ, an add request message APL2_ADD_REQ, or a release message APL2_LID_REL_REQ in the multi-frame established state, the data link layer returns to the multi-frame unestablished state 120.

For data transmission, the data link layer manages two timers in the multi-frame established state 140. The first timer is activated after the data link layer transmits data to a peer, i.e., a data link layer of the other party and expires upon the receipt of acknowledgment for the transmitted data. Unless the acknowledgment has been received until the expiration of the first timer, the data link layer enters an exception recovery state 150.

If no transmit or receive data exists for a predetermined time (i.e., a time-out period of a second timer) in the multi-frame established state 140, the data link layer sends a confirm message to the peer and transits to the exception recovery state 150.

If the first or second timer is restarted in the exception recovery state 150, the data link layer returns to the multi-frame established state 140. Upon request for a radio link in this state, the data link layer returns to the multi-frame unestablished state 120. If the data link layer receives a message PH_DATA_ND, DL_DATA_REQ, APL2_ADD_REQ, or APL2_LID_REL_REQ, it renders the pending command and returns to the multi-frame established state 140 where the pending command is processed.

Upon the receipt of a deactivation indicator DEACT_IND in the above states 120 to 150, the data link layer returns to the initial state 110. Upon the receipt of an establish request message APL2_EST_REQ in the states 120 to 150, the data link layer returns to the multi-frame established awaiting state 130.

Figure 5:
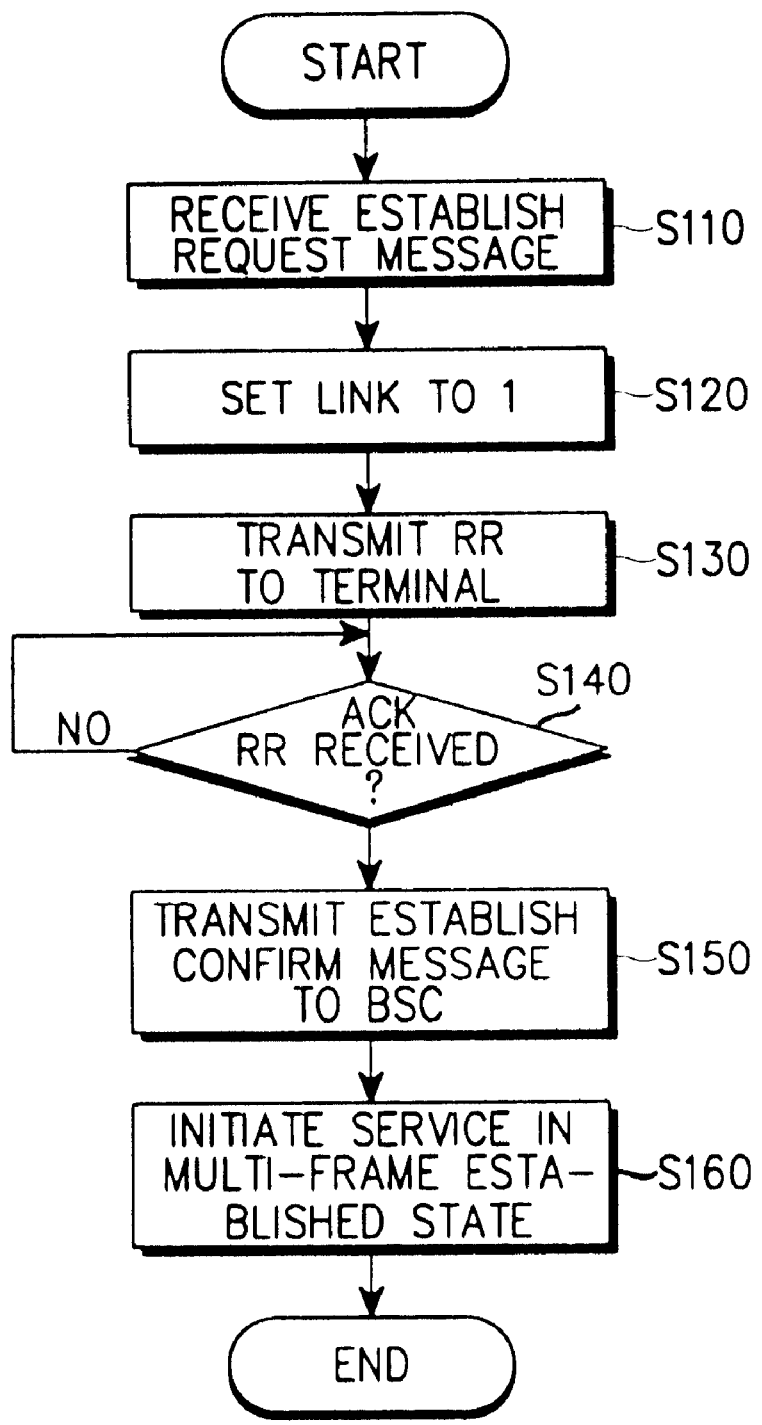
FIG. 5 is a flowchart illustrating a radio link establishing method according to the present invention.

FIG. 5 is a flowchart illustrating a radio link establishing method according to the present invention.

Referring to FIG. 5, if a call is established between a base station and at least one of a plurality of subscriber's equipment connected to a terminal, a BSC transmits a data link layer of a base station an establish request message APL2_EST_REQ in step s110. In step s130, LNK of a radio link to be established is set to 1 to indicate that a new connection is established to the radio link, in step s120. The base station transmits an establish RR message including a corresponding LID to a terminal.

A data link layer uses a predetermined message format. Therefore, the data link layers of the base station and the terminal can analyze their respective received messages. FIG. 6 illustrates a message format in the data link layer as applied to the present invention. According to the message format shown in FIG. 6, a message is comprised of a length field 1 indicating the entire length of the message, a 1-octet address field 2 for identifying the message, an information frame control field 3 indicating the index of transmission information, an RR frame control filed 4 indicating the index of a transmission RR message, an information field 5 for providing transmission information, and a CRC (Cyclic Redundancy Check) field 6 for detecting errors from the length field 1 to the information field 5.

In the address field 2, LID denotes the IDs of radio links 0 to 7. The SAPI (Service Access Point Identifier) indicates whether a corresponding message is a control signal or packet data. If the SAPI is set to 0, it indicates that the message is a control signal. The C/R represents the direction of a message. The C/R is set to 1 for a command from a base station or a response from a terminal, and set to 0 for a response of the base station or a command issued from the terminal. The EST_FLAG is set to 1 to represent a request or response for establishing a data link. If the EXT_FLAG is 1, the address field is extended.

The N(R) in the control field 4 is the received sequence number of a corresponding message, and the N(S) in the control field 3 is the transmitted sequence number of a corresponding message. The P/F in the control fields 3 and 4 indicates that the corresponding message requests for an immediate response. That is, if the P/F is set to 1, an immediate response is requested.

Since an RR message is transmitted for the control of a radio link, it includes neither the information field 5 nor the information frame control field 3. The base station sets "EST_FLAG=1, C/R=1, and P/F=1" to indicate that a corresponding message is an establish RR message.

Upon the receipt of the establish RR message, the terminal establishes the radio link with the LID included in the message and transmits an ACK RR message to the base station.

Upon the receipt of the RR message from the terminal, it determines whether the received RR message is an acknowledgment for the transmitted RR message in step s140. If EST_FLAG is 1, C/R is 1, and P/F is 1, the received RR message is an ACK RR message. If the RR message is not an acknowledgment, the base station discards the RR message and awaits the next RR message.

If the RR message produces an acknowledgment, the base station transmits an establish confirm message APL2_EST_CNF to the BSC, in step s150. Then, the base station transits to the multi-frame established state 140 and initiates a service on the next corresponding radio link (LID) in step s160.

Figure 7:
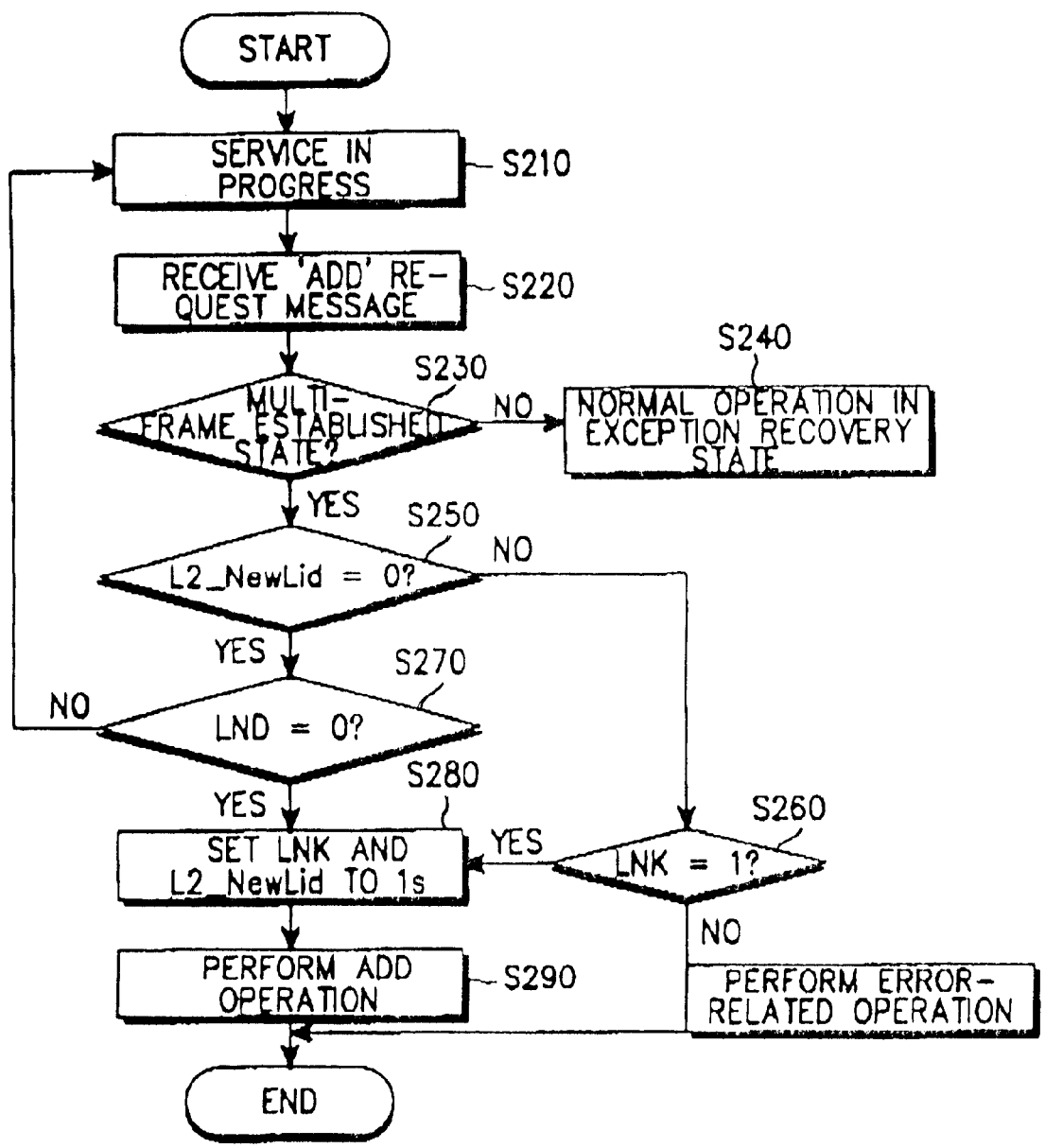
FIG. 7 is a flowchart illustrating an embodiment of a radio link adding method according to the present invention.

FIG. 7 is a flowchart illustrating the embodiment of a radio link adding method according to the present invention.

Referring to FIG. 7, the base station and the terminal establishes a radio link and performs a service according to a command issued from the BSC in step s210, as depicted in FIG. 5. When a call is established between the base station and another subscriber equipment connected to the terminal, the BSC transmits an add request message APL2_ADD_REQ to the data link layer of the base station.

Upon the receipt of the add request message in step s220, the base station checks the current status of its data link layer in step s230. If the data link layer is in the exception recovery state 150, the base station renders the request of the BSC pending and performs an operation corresponding to the exception recovery state 150 in step s240.

If the data link layer is in the multi-frame established state 140, the base station checks L2_NewLid of a radio link to be added in step s250.

If L2_NewLid is 1, which implies that the BSC has requested the radio link to be added, the base station checks the LNK of the radio link, in step s260. If the L2_NewLid=1 and the LNK=0, which cannot occur, it is determined that an error has been generated and an error-related operation is performed, then the procedure ends. If the L2_NewLid=1 and the LNK=1, the corresponding radio link is added in step s290.

If the L2_NewLid is 0, which implies that the BSC has not issued an add request, the base station checks the LNK of the corresponding radio link in step s270. If L2_NewLid=0 and LNK=1, which implies that the radio link has already been assigned, the procedure returns to step s210.

Figure 8:
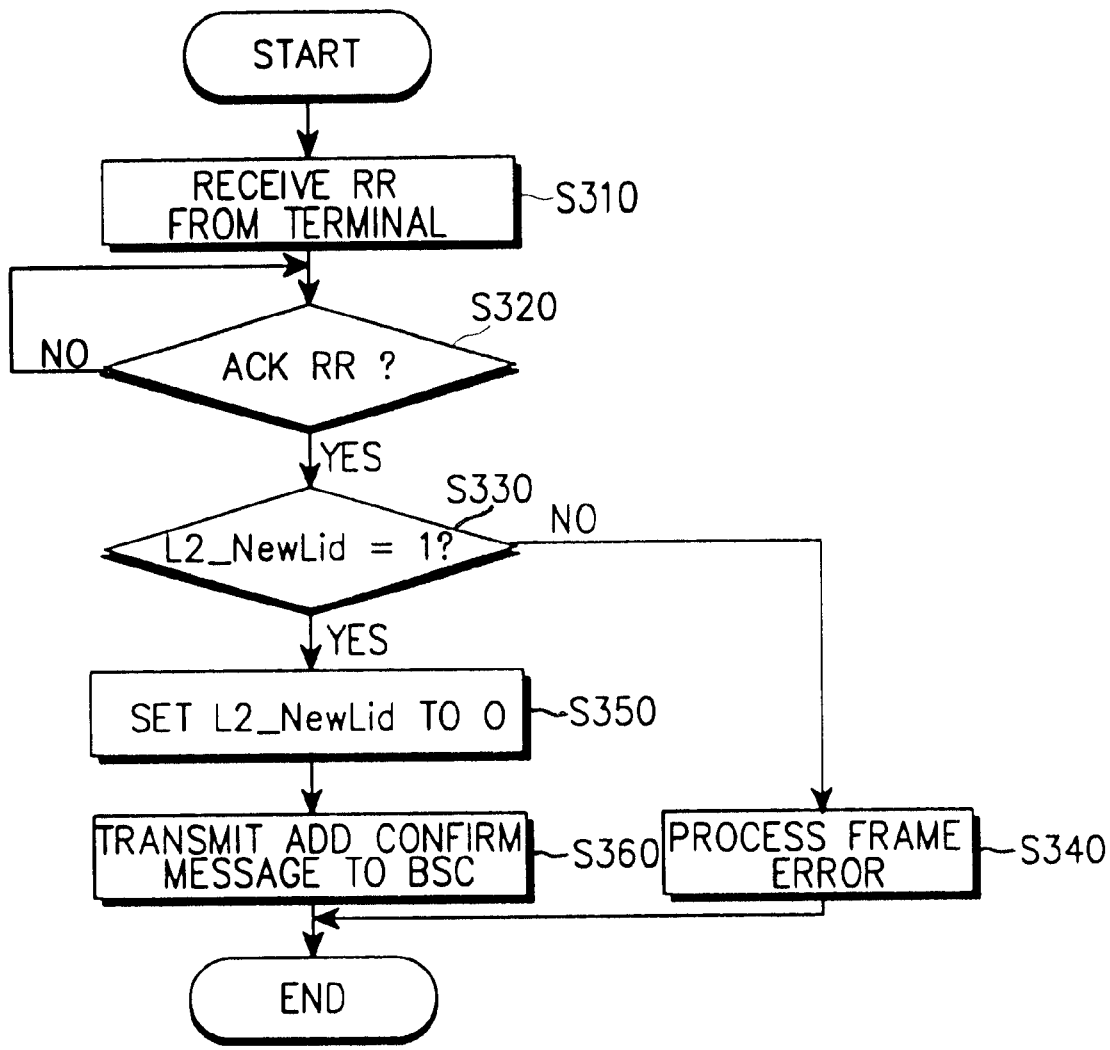
FIG. 8 is a flowchart illustrating an embodiment of a radio link adding procedure according to the present invention; and, FIG. 9 is a flowchart illustrating another embodiment of the radio link adding method according to the present invention.

If both L2_NewLid and LNK are 0s, which implies that the radio link is not in use, L2_NewLid and LNK are set to 1s to notify that an add request is generated in step s280 and the add operation is performed as shown in FIG. 8 in step s290.

Referring to FIG. 8, for the add operation, the base station transmits an add RR message with EST_FLAG=0, C/R=1, P/F=1, and LID=new LID to the terminal in step s310. Upon the receipt of the add RR message, the terminal adds a radio link with the new LID and transmits an ACK RR message with EST_FLAG=0, C/R=1, P/F=1, and LID=new LID to the base station.

If the received RR message is an acknowledgment, the base station determines whether frame errors have occurred while adding the radio link by checking L2_NewLid corresponding to the LID included in the ACK RR message in step s330. If L2_NewLid is 0 indicating existence of frame errors, the base station performs an error-related operation in step s340. If L2_NewLid is 1, the base station sets L2_NewLid corresponding to the LID of the received RR frame to 0, thereby indicating that the corresponding radio link is completely added in step s350. Then, the base station transmits an add confirm message APL2_ADD_CNF to the BSC in step s360, to notify the completion of the add operation.

The data link layer in the multi-frame established state can add a radio link immediately upon the receipt of an add request message in the procedures shown in FIGS. 7 and 8. However, if the data link layer is in the exception recovery state, it renders the command of the BSC, that is, the add request message pending and processes the command after it enters the multi-frame established state.

Figure 9:
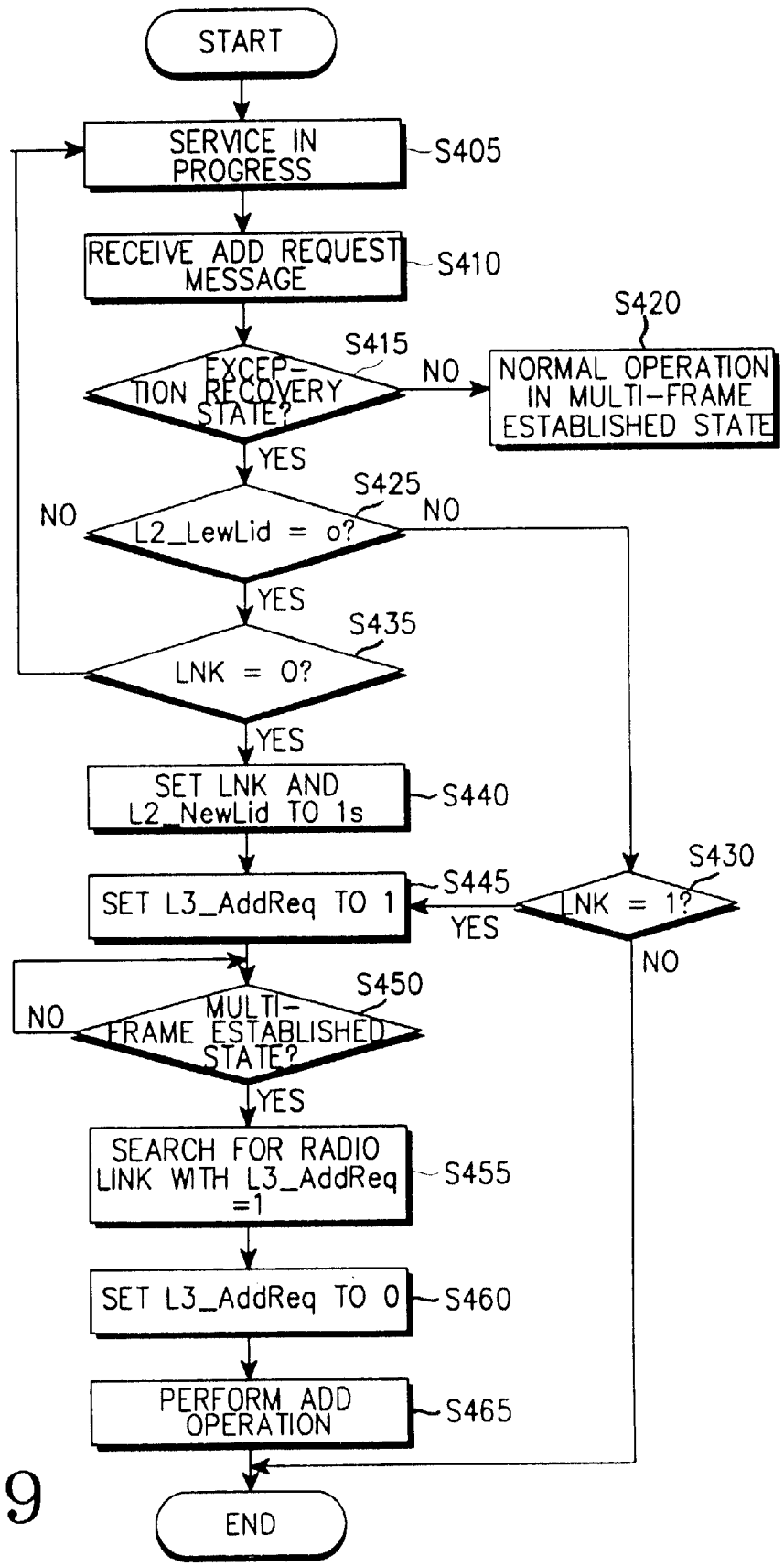

FIG. 9 is a flowchart illustrating another embodiment of the radio link adding method according to the present invention.

Referring to FIG. 9, the base station and the terminal establishes a radio link and performs a service according to a command issued from the BSC in step s405, as depicted in FIG. 5. When a call is established between the base station and another subscriber equipment connected to the terminal, the BSC transmits an add request message APL2_ADD_REQ to the base station.

Upon the receipt of the add request message in step s410, the base station checks the current status of its data link layer in step s415. If the data link layer is in the multi-frame established state 140, the data link layer adds the radio link in the procedure shown in FIG. 7 in step s420.

If the data link layer is in the exception recovery state 150, the data link layer checks L2_newLid of the radio link to be added in step s425.

If L2_NewLid is 1, which implies that the BSC has requested the radio link to be added, the base station checks the LNK of the radio link in step s430. If L2_NewLid=1 and LNK=0, which cannot occur, it is determined that an error has been generated and an error-related operation is performed. Then, the procedure ends. If L2_NewLid=1 and LNK=1, L3AddReq of the corresponding radio link is set to 1, indicating that the add request for the radio link is pending, in step s445.

If L2_NewLid is 0, which implies that the BSC has not issued the add request, the base station checks the LNK of the corresponding radio link in step s435. If L2_NewLid=0 and LNK=1, which implies that the radio link has already been assigned, the procedure returns to step s405.

If both L2_NewLid and LNK are 0s, which implies that the radio link is not in use, L2_NewLid and LNK are set to 1s to notify that an add request is generated, in step s440, and L3_AddReq of the radio link is set to 1 in step s445, notifying that the add request for the radio link is pending.

Then, the data link layer of the base station waits to return to the multi-frame established state 140 in step s450. If the data link layer receives another command (add or release) while it waits, it renders the command pending.

If the data link layer returns to the multi-frame established state 140, the base station searches for a radio link with L3_AddReq set to 1, that is, a radio link which has been requested to be added in the exception recovery state 150 and generates an add request for each corresponding radio link in step s455. In step s460, the data link layer sets L3_AddReqs of the radio links to 0s.

Upon generation of the add request, the data link layer of the base station performs the add operation for the corresponding radio links as shown in FIG. 8 in step s465.

If the data link layer of the base station receives a release request message for releasing all radio links from the BSC, the base station sets the LNK of all radio links to 0s and releases associated resources. The data link layer stores data to be transmitted on a specific radio link in a transmission part of a transmission queue and data which has failed in transmission in a retransmission part of the transmission queue. Upon request for is releasing a certain radio link, the data link layer sets LNK, L2_NewLid, and L3_AddReq to 0s, discards data about the corresponding radio link stored in the transmission and retransmission parts, and deactivates the first timer set for the data.

Unless the data stored in the transmission or retransmission part is discarded, the first timer for the data times out after the radio link is released. In this case, the data link layer retransmits the data and cannot receive an acknowledgment message for the retransmitted data from a data link layer of the other party since the radio link has already been released. Then, the data link layer considers that errors exist on the radio link and releases all the radio links. As a result, a call in service on another radio link may be released.

As described above, the present invention efficiently manages each radio link when a plurality of radio links are used between a base station and a terminal in a WLL. Therefore, a radio link can be established, added, or released without influencing a call on another radio link.

While the invention has been shown and described with reference to certain preferred embodiments thereof, it will be understood by those skilled in the art that various changes in form and detail may be made therein without departing from the spirit and the scope of the invention as defined by the appended claims.

What is claimed is:

1. A method of managing a plurality of radio links between a base station and a terminal by a data link layer of the base station according to a command generated from a base station controller (BSC) in a wireless local loop (WLL) system, wherein the state of each radio link is defined as L2_NewLid for indicating an establishment of the radio link is requested but not completed, LNK for indicating that a new connection is established to the radio link, and L3_AddReq for indicating that an establishment of the radio link is pending, the method comprising the steps of:
   (1) receiving at the base station a radio link establish request message from the BSC;
   (2) setting the LNK to 1 for a new connection of a radio link to be established;
   (3) transmitting from the base station a request for establishing the radio link to the terminal;
   (4) receiving an acknowledgment from the terminal that the request transmitted in step (3) has been received;
   (5) notifying the BSC that the radio link with the terminal is established upon receiving the acknowledgment by the base station; and,
   (6) initiating a service between the terminal and the base station on the established radio link in step (5).

2. The method of claim 1, wherein the data link layer transmits the terminal a receive ready (RR) message with EST_FLAG=1, C/R=1, and P/F=1, and the ID of the radio link to be established in the step (3), and wherein the EST_FLAG indicates whether a message is for establishing a data link or not, the C/R indicates the direction of the message, and the P/F indicates whether the message requires an immediate response.

3. The method of claim 1, wherein a receive ready (RR) message with EST_FLAG=1, C/R=1, and P/F=1, and the ID of the radio link to be established is received from the terminal in the step (4), and wherein EST_FLAG indicates whether a message is for establishing a data link or not, C/R indicates the direction of the message, and P/F indicates whether the message requires an immediate response.

4. The method of claim 2, wherein an RR message with EST_FLAG=1, C/R=1, and P/F=1, and the ID of the radio link to be established is received in the acknowledgment from the terminal.

5. A method of managing a plurality of radio links between a base station and a terminal by a data link layer of the base station according to a command generated from a base station controller (BSC) in a wireless local loop (WLL) system, the state of each radio link of the plurality of radio links being defined respectively as L2_NewLid for indicating an establishment of the radio link is requested but not completed, LNK for indicating that a new connection is established to the radio link, and L3_AddReq for indicating an establishment of the radio link is pending, said method comprising the steps of:
   (1) receiving an add request message for a new radio link on a radio link;
   (2) checking the L2_NewLid and the LNK of the new radio link to be added if the data link layer is in a multi-frame established state;
   (3) adding the new radio link if the L2_NewLid and the LNK are 1s;
   (4) determining that frame errors have occurred and performing an add failure operation if the L2_NewLid is 1 and the LNK is 0;
   (5) performing an add failure operation if the L2_NewLid is 0 and the LNK is 1;
   (6) setting both the L2_NewLid and the LNK of the new radio link to 1s if both the L2_NewLid and the LNK are 0s; and,
   (7) adding the new radio link.

6. The method of claim 5, wherein the step (7) comprises the steps of:
   (i) transmitting an add request message for the new radio link to the terminal;
   (ii) receiving an acknowledgment from the terminal;
   (iii) checking the L2_NewLid of the new radio link upon the receipt of the acknowledgment;
   (iv) determining that frame errors have occurred and performing an add failure operation if the L2_NewLid is 0;
   (v) setting the L2_NewLid to 0 if the L2_NewLid is 1; and,
   (vi) notifying the BSC that the radio link is added.

7. The method of claim 6, wherein the data link layer transmits the terminal an RR message with EST_FLAG=0, C/R=1, and P/F=1, and the ID of the new radio link in the add request message transmitting step, and wherein the EST_FLAG indicates whether a message is for establishing a data link or not, the C/R indicates the direction of the message, and the P/F indicates whether the message requires an immediate response.

8. The method of claim 6, wherein the data link layer receives an RR message with EST_FLAG=0, C/R=1, and P/F=1, and the ID of the new radio link from the terminal in the step (ii), and wherein the EST_FLAG indicates whether a message is for establishing a data link or not, the C/R indicates the direction of the message, and the P/F indicates whether the message requires an immediate response.

9. The method of claim 7, wherein the data link layer receives an RR message with EST_FLAG=0, C/R=1, and P/F=1, and the ID of the new radio link from the terminal in step (ii).

10. A method of managing a plurality of radio links between a base station and a terminal by a data link layer of the base station according to a command generated from a base station controller (BSC) in a wireless local loop (WLL) system, the state of each radio link being defined as L2_NewLid indicating an establishment of the radio link is requested but not completed, LNK indicating that a new connection is established to the radio link, and L3_AddReq indicating establishment of the radio link is pending, the method comprising the steps of:
   (1) receiving an add request message for a new radio link;
   (2) checking the L2_NewLid and the LNK of the new radio link to be added if the data link layer is in an exception recovery state;
   (3) setting the L3_AddReq of the new radio link to 1 if the L2_NewLid and the LNK are 1s;
   (4) determining that frame errors have occurred and performing an add failure operation if the L2_NewLid is 1 and the LNK is 0;
   (5) performing an add failure operation if the L2_NewLid is 0 and the LNK is 1;
   (6) setting the L2_NewLid, the LNK, and the L3_AddReq of the new radio link to 1s if both the L2_NewLid and the LNK are 0s;
   (7) waiting to transmit to a multi-frame established state after the L3_AddReq is set to 1;
   (8) searching for a radio link with the L3_AddReq=1 after the data link layer transmits to the multi-frame established state;

(9) setting the L3_AddReq of the searched radio link to 0; and,

(10) adding the searched radio link.

11. The method of claim 10, wherein the step (10) comprises the steps of:

(i) transmitting an add request message for the searched radio link to the terminal from the base station;

(ii) receiving by the base station an acknowledgment from the terminal;

(iii) checking the L2_NewLid of the searched radio link upon the receipt of the acknowledgment in step (ii);

(iv) determining that frame errors have occurred and performing an add failure operation if the L2_NewLid is 0;

(v) setting the L2_NewLid to 0 if the L2_NewLid is 1; and, (vi) notifying the BSC that the searched radio link is added.

12. The method of claim 11, wherein the data link layer transmits the terminal a ready receive (RR) message with EST_FLAG=0, C/R=1, and P/F=1, and the ID of the searched radio link in the add request message transmitting step, and wherein the EST_FLAG indicates whether a message is for establishing a data link or not, the C/R indicates the direction of the message, and the P/F indicates whether the message requires an immediate response.

13. The method of claim 11, wherein the data link layer receives a ready receive (RR) message with EST_FLAG=0, C/R=1, and P/F=1, and the ID of the searched radio link from the terminal in the acknowledgment receiving step.

14. The method of claim 12, wherein the data link layer receives an RR message with EST_FLAG=0, C/R=1, and P/F=1, and the ID of the searched radio link from the terminal in the acknowledgment receiving step.

15. A method of managing a plurality of radio links between a base station and a terminal by a data link layer of the base station according to a command generated from a BSC in a WLL system, the states of each radio link being defined as L2_NewLid indicating establishment of the radio link is requested but not completed, LNK indicating that a new connection is established to the radio link, and L3_AddReq indicating an establishment of the radio link is pending, the method comprising the steps of:

(1) receiving a release request message for a radio link at the base station;

(2) setting to 0 the LNK of the radio link to be released;

(3) transmitting a release request message for the radio link to the terminal;

(4) receiving an acknowledgment from the terminal; and, (5) notifying the BSC that the radio link is released upon the receipt of the acknowledgment.

* * * * *